United States Patent
Kondo

(10) Patent No.: US 11,836,063 B2
(45) Date of Patent: Dec. 5, 2023

(54) SYSTEM, CONTROL DEVICE, LOG EXTRACTION METHOD, AND COMPUTER-READABLE MEDIUM

(71) Applicant: EVIDENT CORPORATION, Nagano (JP)

(72) Inventor: Kanako Kondo, Tokyo (JP)

(73) Assignee: Evident Corporation, Nagano (JP)

( * ) Notice: Subject to any disclaimer, the term of this patent is extended or adjusted under 35 U.S.C. 154(b) by 0 days.

(21) Appl. No.: 17/712,427

(22) Filed: Apr. 4, 2022

(65) Prior Publication Data

US 2022/0318114 A1    Oct. 6, 2022

(30) Foreign Application Priority Data

Apr. 5, 2021  (JP) .................... 2021-064248

(51) Int. Cl.
| | |
|---|---|
| *G06F 11/00* | (2006.01) |
| *G06F 11/30* | (2006.01) |
| *G06F 11/07* | (2006.01) |
| *G06F 11/32* | (2006.01) |

(52) U.S. Cl.
CPC ...... *G06F 11/3075* (2013.01); *G06F 11/0772* (2013.01); *G06F 11/327* (2013.01)

(58) Field of Classification Search
CPC .............. G06F 11/3476; G06F 11/079; G06F 11/3006; G06F 11/3636; G06F 2201/835; G06F 2201/86; G06F 11/30
See application file for complete search history.

(56) References Cited

U.S. PATENT DOCUMENTS

| | | | | |
|---|---|---|---|---|
| 5,557,742 A | * | 9/1996 | Smaha ................... | G06F 21/554 |
| | | | | 714/48 |
| 11,507,447 B1 | * | 11/2022 | Ezrielev .............. | G06F 11/3476 |
| 2021/0191798 A1 | * | 6/2021 | Zhang ................ | G06F 11/3476 |

FOREIGN PATENT DOCUMENTS

| | | |
|---|---|---|
| JP | 2004309716 A | 11/2004 |
| JP | 2016177594 A | 10/2016 |

* cited by examiner

*Primary Examiner* — Charles Ehne
(74) *Attorney, Agent, or Firm* — Scully, Scott, Murphy & Presser, P.C.

(57) ABSTRACT

A system includes a control device including a processor. The processor is configured to record a log into a log file, the log regarding information on an event having occurred in the system such that an operation state of the system at a point in time of the occurrence of the event is allowed to be specified as any of a plurality of operation states and an operation state different from the plurality of operation states. Here, the plurality of operation states correspond to a plurality of pieces of sequence processing previously defined. The processor is configured to extract the log from the log file, based on information designating a particular operation state as the operation state of the system, in units of operation states of the system such that the log includes information on an event having occurred in the particular operation state.

16 Claims, 21 Drawing Sheets

LOG FILE     18a

<STARTUP> ← TAG
XXXX/XX/XX XX:XX STARTUP PROCESSING START ← LOG
XXXX/XX/XX XX:XX SOFTWARE STARTUP PROCESSING ← LOG
XXXX/XX/XX XX:XX HARDWARE INITIALIZATION PROCESSING START
XXXX/XX/XX XX:XX STAGE INITIALIZATION START
XXXX/XX/XX XX:XX STAGE MOVEMENT INSTRUCTION X: 0 Y: 0
XXXX/XX/XX XX:XX STAGE MOVEMENT RESULT X: 0 Y: 0 SUCCESS
XXXX/XX/XX XX:XX STAGE MOVEMENT INSTRUCTION X: 50000 Y: 50000
XXXX/XX/XX XX:XX STAGE MOVEMENT RESULT X: 50000 Y: 50000 SUCCESS
‥‥‥
XXXX/XX/XX XX:XX INITIALIZATION PROCESSING TERMINATION
<IDLE>
XXXX/XX/XX XX:XX OBJECTIVE LENS REPLACEMENT INSTRUCTION 1 -> 6
XXXX/XX/XX XX:XX OBJECTIVE LENS REPLACEMENT INSTRUCTION 1 -> 6 SUCCESS
XXXX/XX/XX XX:XX IMAGE CAPTURING Z-POSITION SETTING INSTRUCTION 0 TO 1 $\mu$m EVERY 1 $\mu$m
XXXX/XX/XX XX:XX IMAGE CAPTURING START INSTRUCTION
<IMAGE CAPTURING>
XXXX/XX/XX XX:XX Z-MOVEMENT 0 $\mu$m SUCCESS
XXXX/XX/XX XX:XX IMAGE CAPTURING
XXXX/XX/XX XX:XX Z-MOVEMENT 1 $\mu$m SUCCESS
XXXX/XX/XX XX:XX IMAGE CAPTURING
XXXX/XX/XX XX:XX IMAGE SAVING TERMINATION
<IDLE>
‥‥‥
<IMAGE CAPTURING>
‥‥‥
<IDLE>
‥‥‥
<IMAGE CAPTURING>
‥‥‥
<IDLE>
XXXX/XX/XX XX:XX ANALYSIS CONDITION SETTING
XXXX/XX/XX XX:XX ANALYSIS START
<ANALYSIS>
‥‥
<IDLE>
‥‥
<TERMINATION>
XXXX/XX/XX XX:XX TERMINATION PROCESSING START
XXXX/XX/XX XX:XX SETTING SAVING
XXXX/XX/XX XX:XX SOFTWARE SHUTDOWN PROCESSING
XXXX/XX/XX XX:XX TERMINATION PROCESSING TERMINATION

FIG. 6

LOG FILE 18b

| Timestamp | TAG | Message |
|---|---|---|
| XXXX/XX/XX XX:XX | <STARTUP> | STARTUP PROCESSING START ← LOG |
| XXXX/XX/XX XX:XX | <STARTUP> | SOFTWARE STARTUP PROCESSING ← LOG |
| XXXX/XX/XX XX:XX | <STARTUP> | HARDWARE INITIALIZATION PROCESSING START |
| XXXX/XX/XX XX:XX | <STARTUP> | STAGE INITIALIZATION START |
| XXXX/XX/XX XX:XX | <STARTUP> | STAGE MOVEMENT INSTRUCTION X: 0 Y: 0 |
| XXXX/XX/XX XX:XX | <STARTUP> | STAGE MOVEMENT RESULT X: 0 Y: 0 SUCCESS |
| XXXX/XX/XX XX:XX | <STARTUP> | STAGE MOVEMENT INSTRUCTION X: 50000 Y: 50000 |
| XXXX/XX/XX XX:XX | <STARTUP> | STAGE MOVEMENT RESULT X: 50000 Y: 50000 SUCCESS |
| ..... | | |
| XXXX/XX/XX XX:XX | <STARTUP> | INITIALIZATION PROCESSING TERMINATION |
| XXXX/XX/XX XX:XX | <IDLE> | OBJECTIVE LENS REPLACEMENT INSTRUCTION 1 -> 6 |
| XXXX/XX/XX XX:XX | <IDLE> | OBJECTIVE LENS REPLACEMENT INSTRUCTION 1 -> 6 SUCCESS |
| XXXX/XX/XX XX:XX | <IDLE> | IMAGE CAPTURING Z-POSITION SETTING INSTRUCTION 0 TO 1 $\mu$m EVERY 1 $\mu$m |
| XXXX/XX/XX XX:XX | <IDLE> | IMAGE CAPTURING START INSTRUCTION |
| XXXX/XX/XX XX:XX | <IMAGE CAPTURING> | Z-MOVEMENT 0 $\mu$m SUCCESS |
| XXXX/XX/XX XX:XX | <IMAGE CAPTURING> | IMAGE CAPTURING |
| XXXX/XX/XX XX:XX | <IMAGE CAPTURING> | Z-MOVEMENT 1 $\mu$m SUCCESS |
| XXXX/XX/XX XX:XX | <IMAGE CAPTURING> | IMAGE CAPTURING |
| XXXX/XX/XX XX:XX | <IMAGE CAPTURING> | IMAGE SAVING TERMINATION |
| ..... | | |
| XXXX/XX/XX XX:XX | <IDLE> | ANALYSIS CONDITION SETTING |
| XXXX/XX/XX XX:XX | <IDLE> | ANALYSIS START |
| .... | | |
| XXXX/XX/XX XX:XX | <TERMINATION> | TERMINATION PROCESSING START |
| XXXX/XX/XX XX:XX | <TERMINATION> | SETTING SAVING |
| XXXX/XX/XX XX:XX | <TERMINATION> | SOFTWARE SHUTDOWN PROCESSING |
| XXXX/XX/XX XX:XX | <TERMINATION> | TERMINATION PROCESSING TERMINATION |

FIG. 8

FAILURE-TO-OPERATION-STATE
CORRESPONDENCE TABLE T1

| [FAILURE] | | [OPERATION STATE] |
|---|---|---|
| STARTUP FAILURE DUE TO ERROR | | STARTUP STATE |
| IMAGE CAPTURING FAILURE DUE TO ERROR | | IMAGE CAPTURING STATE |
| ANALYSIS FAILURE DUE TO ERROR | | ANALYSIS STATE |
| CONDITION SETTING FAILURE | | IDLE STATE |
| HARDWARE FAILURE | (STARTUP PROCESSING) | STARTUP STATE |
| | (IMAGE CAPTURING PROCESSING) | IMAGE CAPTURING STATE |
| | (ANALYSIS PROCESSING) | ANALYSIS STATE |
| | (IDLE PROCESSING) | IDLE STATE |
| | (TERMINATION PROCESSING) | TERMINATION STATE |
| MEMORY SHORTAGE | (STARTUP PROCESSING) | STARTUP STATE |
| | (IMAGE CAPTURING PROCESSING) | IMAGE CAPTURING STATE |
| | (ANALYSIS PROCESSING) | ANALYSIS STATE |
| | (IDLE PROCESSING) | IDLE STATE |
| | (TERMINATION PROCESSING) | TERMINATION STATE |

```
<STARTUP>
XXXX/XX/XX XX:XX  STARTUP PROCESSING START
.....
XXXX/XX/XX XX:XX  INITIALIZATION PROCESSING TERMINATION
<IDLE>
.....
<IMAGE CAPTURING>
XXXX/XX/XX XX:XX  Z-MOVEMENT 0 μm SUCCESS
XXXX/XX/XX XX:XX  IMAGE CAPTURING
XXXX/XX/XX XX:XX  Z-MOVEMENT 1 μm SUCCESS
XXXX/XX/XX XX:XX  IMAGE CAPTURING
XXXX/XX/XX XX:XX  IMAGE SAVING TERMINATION
XXXX/XX/XX XX:XX  C:\Users\Owner\Pictures\log\XX1.jpg    ← PATH TO IMAGE
<IDLE>
.....
<ANALYSIS>
XXXX/XX/XX XX:XX  FIRST IMAGE CAPTURE
XXXX/XX/XX XX:XX  C:\Users\Owner\Pictures\log\XX2.jpg    ← PATH TO IMAGE
XXXX/XX/XX XX:XX  SECOND IMAGE CAPTURE
XXXX/XX/XX XX:XX  C:\Users\Owner\Pictures\log\XX3.jpg    ← PATH TO IMAGE
XXXX/XX/XX XX:XX  COUPLING PROCESSING
XXXX/XX/XX XX:XX  COUPLED IMAGE DISPLAY
XXXX/XX/XX XX:XX  C:\Users\Owner\Pictures\log\XX4.jpg    ← PATH TO IMAGE
<IDLE>
.....
<TERMINATION>
.....
XXXX/XX/XX XX:XX  TERMINATION PROCESSING TERMINATION
```

FIG. 20

SYSTEM, CONTROL DEVICE, LOG EXTRACTION METHOD, AND COMPUTER-READABLE MEDIUM

This application is based upon and claims the benefit of priority from prior Japanese Patent Application No. 2021-064248, filed Apr. 5, 2021, the entire contents of which are incorporated herein by this reference.

TECHNICAL FIELD

The disclosure of the present specification relates to a system, a control device, a log extraction method, and a computer-readable medium.

BACKGROUND

A microscopic system is sophisticated because of its various drive units in combination. Thus, if failure occurs in such a microscopic system, a user not infrequently has difficulty in solving the problem alone. In such a case, the user needs to solve the problem, in cooperation with the support division in a provider that provides microscopic systems.

In order to report the failure to the support division and make a request for support for problem-solving, typically, a log file that the microscopic system outputs is sent to the support division. In general, the support division analyzes information (log) in such a log file, to specify the cause of the failure. Thus, such a log is very useful information for problem-solving. For example, JP 2004-309716 A has disclosed a technology regarding logging in a microscopic system.

SUMMARY

According to one aspect of the present invention, provided is a system including a control device. The control device includes a processor. The processor is configured to: record a log into a log file, the log regarding information on an event having occurred in the system such that an operation state of the system at a point in time of the occurrence of the event is allowed to be specified as any of a plurality of operation states and an operation state different from the plurality of operation states, the plurality of operation states corresponding to a plurality of pieces of sequence processing previously defined; and extract the log from the log file, based on information designating a particular operation state as the operation state of the system, in units of operation states of the system such that the log includes information on an event having occurred in the particular operation state.

According to one aspect of the present invention, provided is a control device for a system. The control device includes a processor. The processor is configured to: record a log into a log file, the log regarding information on an event having occurred in the system such that an operation state of the system at a point in time of the occurrence of the event is allowed to be specified as any of a plurality of operation states and an operation state different from the plurality of operation states, the plurality of operation states corresponding to a plurality of pieces of sequence processing previously defined; and extract the log from the log file, based on information designating a particular operation state as the operation state of the system, in units of operation states of the system such that the log includes information on an event having occurred in the particular operation state.

According to one aspect of the present invention, provided is a log extraction method including: recording a log into a log file, the log regarding information on an event having occurred in a system such that an operation state of the system at a point in time of the occurrence of the event is allowed to be specified as any of a plurality of operation states and an operation state different from the plurality of operation states, the plurality of operation states corresponding to a plurality of pieces of sequence processing previously defined; and extracting the log from the log file, based on information designating a particular operation state as the operation state of the system, in units of operation states of the system such that the log includes information on an event having occurred in the particular operation state.

According to one aspect of the present invention, provided is a non-transitory computer-readable medium storing a program for causing a computer in a system to perform: processing of recording, into a log file, a log regarding information on an event having occurred in the system such that an operation state of the system at a point in time of the occurrence of the event is allowed to be specified as any of a plurality of operation states and an operation state different from the plurality of operation states, the plurality of operation states corresponding to a plurality of pieces of sequence processing previously defined; and processing of extracting, based on information designating a particular operation state as the operation state of the system, from the log file, the log in units of operation states of the system such that the log includes information on an event having occurred in the particular operation state.

BRIEF DESCRIPTION OF DRAWINGS

The present invention will be more apparent from the following detailed description when the accompanying drawings are referenced.

FIG. 6 illustrates an exemplary configuration of a log file;

FIG. 8 illustrates an exemplary configuration of another log file;

FIG. 15 is an exemplary correspondence table between failure and operation state;

FIG. 20 illustrates an exemplary configuration of still another log file; and

DESCRIPTION

Logging is continuously performed with a system in operation, and thus the volume of data of a log tends to increase. In particular, such a tendency is significant in a sophisticated system including many drive units like a laser scanning microscopic system. Sending such a large volume of log to a support division causes some undesirable problems.

For achievement of problem-solving, a long time is required at each step, such as time-consuming file compression before sending, time-consuming file transmission and reception, and time-consuming analytical work at the support division. Thus, as an exemplary problem, prompt problem-solving is difficult to expect. Because a cloud storage has been utilized for delivery of files in recent years, the support division is likely to receive, around the same time, requests for support from a plurality of users. Thus, it is necessary to secure a cloud storage manyfold larger in volume than logs to be interchanged. Thus, a large increase is likely to be caused in cost.

Therefore, desirably, the volume of a log to be interchanged with the support division is equivalent to as small a range involving information necessary for investigation of the cause of occurrence of failure as possible. However, it is not easy for a user to select a log and send only necessary information. Because of the feature of a log file, it is undesirable that the log file is edited freely by the user.

In consideration of such an actual situation as above, an embodiment of the present invention will be described below.

Figure 1:
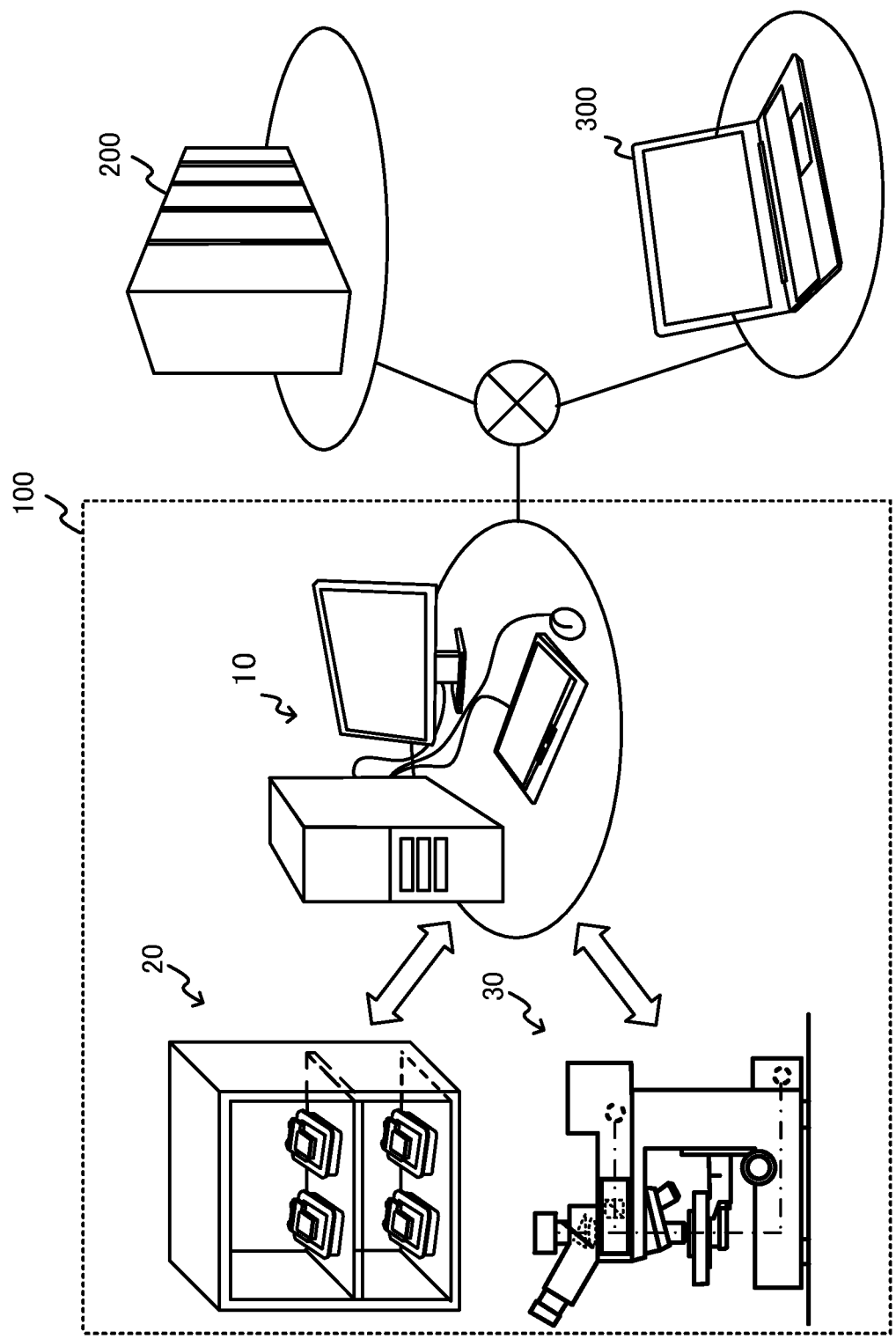
FIG. 1 is an explanatory diagram of the configuration of a system according to an embodiment that makes an interchange with a client.

As illustrated in FIG. 1, a system 100 includes at least one controllable device 20 and a control device 10 that controls the at least one controllable device 20. The system 100 is capable of communication with a server 200 and a client 300 through a network, such as the Internet.

For example, a controllable device 20 included in the system 100 is, but not particularly limited to, a capturing device. As illustrated in FIG. 1, an exemplary controllable device 20 may be an observation device disposed in an incubator or may be a microscope. Alternatively, the exemplary controllable device 20 may be an endoscope. The control device 10 may serve as an image processing device that processes an image acquired by a controllable device 20. It should be noted that, as a controllable device 20, provided may be any device different from capturing devices. As a controllable device 20, for example, provided may be any measurement device. In that case, the control device 10 may serve as a processing device that processes a result of measurement.

The control device 10 records, into a log file, as a log, information on any event having occurred in the system 100. For example, a log includes, but not particularly limited to, the operation detail of software that operates on the control device 10 (e.g., input/output information or the detail of execution of a program during sequence processing), at the time of control of each drive unit of a controllable device 20 by the software, the name of the drive unit as the instruction target and the detail of an instruction, and information on a result of operation of the drive unit based on the instruction (success/failure). The control device 10 continuously records such a log. If failure occurs in the system 100, the log file is analyzed, so that the cause of the failure can be revealed. The control device 10 may create a new log file every time the existing log file reaches a certain size. It should be noted that a log file may be created in a storage in the control device 10 or may be created in an external storage.

In addition, at the timing at which the need arises, such as at the time of occurrence of failure, the control device 10 can extract, from the log file, a log conductive to specification of the cause of the failure. It should be noted that the control device 10 will be described in detail below.

For example, the server 200 corresponds to a computer having a large volume of cloud storage, disposed on the network. The server 200 provides a cloud storage service enabling sharing of a large volume of file and is accessible from both of the system 100 and the client 300. Specifically, for example, the server 200 may function as a Web application server on which a Web application operates for uploading and downloading of a log file to be described below. It should be noted that the server 200 may be achieved by a single computer or a plurality of computers.

For example, the client 300 serves as a terminal that is used in the support division in the provider that provides the system 100. For example, the client 300 is, but not particularly limited to, a personal computer (desktop computer, laptop computer, or tablet computer). It should be noted that the client 300 may be any other computer sufficient in throughput, such as a smartphone or a mobile phone.

In a case where failure occurs in the system 100 and then a user makes a request to the support division for support for problem-solving, in the system 100, firstly, the control device 10 extracts, from the log file, a log conductive to specification of the cause of the failure. The control device 10 may extract the log in accordance with a command from the user having been notified of the occurrence of the failure or automatically. Hereinafter, a log file including the extracted log is referred to as an extraction file so as to be distinguished from the original log file.

Next, the control device 10 uploads the extraction file to the server 200 and shares the extraction file with the support division. The control device 10 may upload the extraction file in accordance with a command from the user or automatically.

Thus, the client 300 can download the extraction file through access to the server 200, so that the cause of the failure can be investigated at the support division.

In particular, in the system 100, the control device 10 extracts in advance a log conductive to specification of the cause of the failure and uploads the extraction file to the server 200. Typically, the extraction file is sufficiently smaller in the volume of data than the original log file. Thus, the duration of uploading and the duration of downloading can be each shortened, so that the time required for problem-solving can be expected to be shortened. Conventionally, after receiving a log file, a person in charge of analysis extracts any log possibly involved with the cause from the log file. In contrast, automatic extraction of the log by the control device 10 enables a person in charge of analysis to avoid such troublesome work, leading to a reduction in the time required for analysis. Thus, a prompt recovery can be made from the failure state, so that an enhancement can be made in the rate of system operation. Furthermore, the extraction file is relatively small in the volume of data, leading to a saving in the storage volume of the server 200 that mediates interchange between the system 100 and the client 300.

Figure 2:
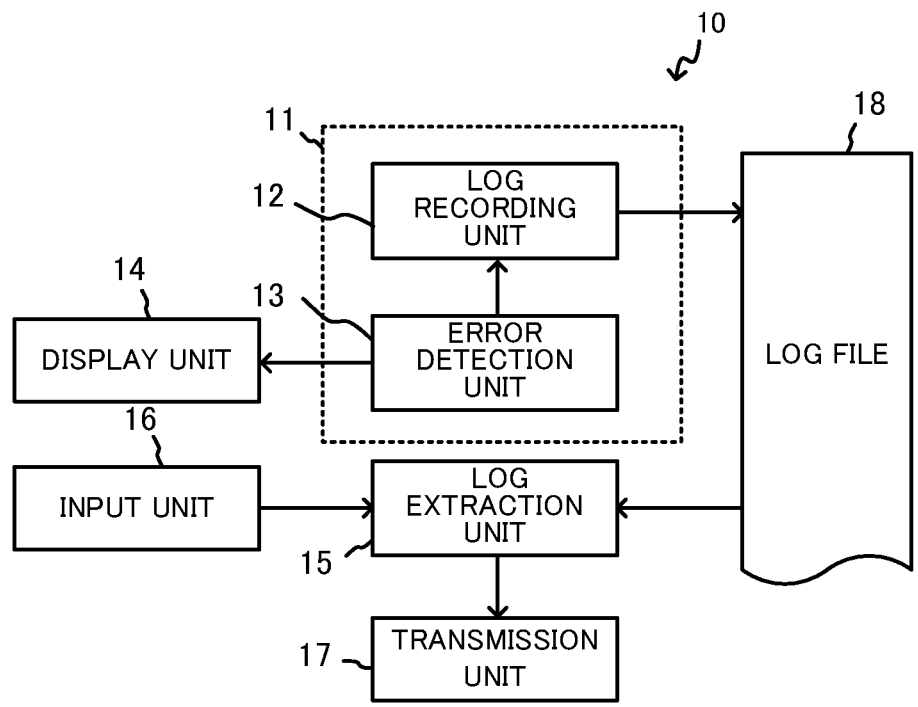
FIG. 2 illustrates an exemplary functional configuration of a control device.

FIG. 2 illustrates an exemplary functional configuration of the control device 10. The function related to a log of the control device 10 will be described below with reference to FIG. 2.

The control device 10 includes a log recording unit 12 and a log extraction unit 15.

The log recording unit 12 records, into a log file 18, a log regarding information on any event having occurred in the system 100. More specifically, the log recording unit 12 records a log into the log file 18 such that the operation state of the system 100 at the point in time of occurrence of the event can be specified.

The system 100 can transition to any of at least three operation states including a plurality of operation states corresponding to a plurality of pieces of sequence processing previously defined and an operation state different therefrom. Here, the plurality of operation states, corresponding to the plurality of pieces of sequence processing, each corresponds to a state where the corresponding piece of sequence processing is in operation. Sequence processing corresponds to an aggregate of pieces of processing in series previously determined that starts in accordance with a command from the user. Specific examples of sequence processing include startup processing that starts in response to a startup command from the user, image capturing processing that starts in response to an image capturing command from the user, and analysis processing that starts in response to an analysis command from the user.

It should be noted that a command from the user and the timing at which sequence processing starts are typically synchronized, but do not necessarily need to be synchronized. For example, sequence processing may start at the time designated in advance by the user. That is, sequence processing is required to start in accordance with a command from the user, and thus do not necessarily need to start immediately after the command.

As above, the log recording unit 12 records a log into the log file 18 such that the operation state of the system 100 at the point in time of occurrence of an event can be specified as any of the plurality of operation states corresponding to the plurality of pieces of sequence processing previously defined and an operation state different therefrom.

On the basis of information designating a particular operation state as the operation state of the system 100, the log extraction unit 15 extracts, from the log file 18, a log in units of operation states of the system 100 such that the log includes information on an event having occurred in the particular operation state.

The system 100 including the log recording unit 12 and the log extraction unit 15 enables extraction of a log in units of operation states. Thus, as described below, a proper volume of log necessary for investigation of the cause of occurrence of failure can be extracted easily.

As illustrated in FIG. 2, the control device 10 may further include an error detection unit 13, a display unit 14, an input unit 16, and a transmission unit 17 or include other functional units.

The error detection unit 13 detects an error having occurred in the system 100. Here, examples of such an error include, but not particularly limited to, an unexpected exception and an expected exception that disables continuation of processing. The error detection unit 13 detects the occurrence of such an exception as an error. For example, the error detected by the error detection unit 13 may be reported to the log recording unit 12, and the detail thereof may be recorded as a log into the log file 18. It should be noted that, as illustrated in FIG. 2, the log recording unit 12 and the error detection unit 13 may operate, but not particularly limited to, as a common application 11 and may operate at all times, for example, with the control device 10 in operation.

The error detection unit 13 may further specify the operation main to which the event involving the detected error belongs. For example, the error detection unit 13 may specify which controllable device 20 is the operation main or may specify which drive unit of which controllable device 20 is the operation main.

The display unit 14 displays information regarding failure due to the error detected by the error detection unit 13. Here, such failure corresponds to deviation of the system from an expected function, service, or result. A specific exemplary failure is a failure on particular sequence processing, namely, a state disabling normal termination. For example, such information regarding failure includes descriptions regarding the failure or error and may further include solutions to the failure.

The display unit 14 displays a graphical user interface (GUI) for the user to select a condition of extraction for a log that the log extraction unit 15 extracts. For example, the GUI may include a GUI component for designating a type of failure (first GUI component) and may include a GUI component for designating a period (second GUI component).

The input unit 16 inputs, to the log extraction unit 15, information designating a particular operation state. For example, the input unit 16 inputs, to the log extraction unit 15, information designated with the first GUI component displayed on the display unit 14 as information designating a particular operation state.

The transmission unit 17 transmits the log extracted by the log extraction unit 15 to a storage device on the network. The storage device on the network is, for example, the server 200, and the transmission unit 17 uploads the extraction file to the server 200.

Figure 3:
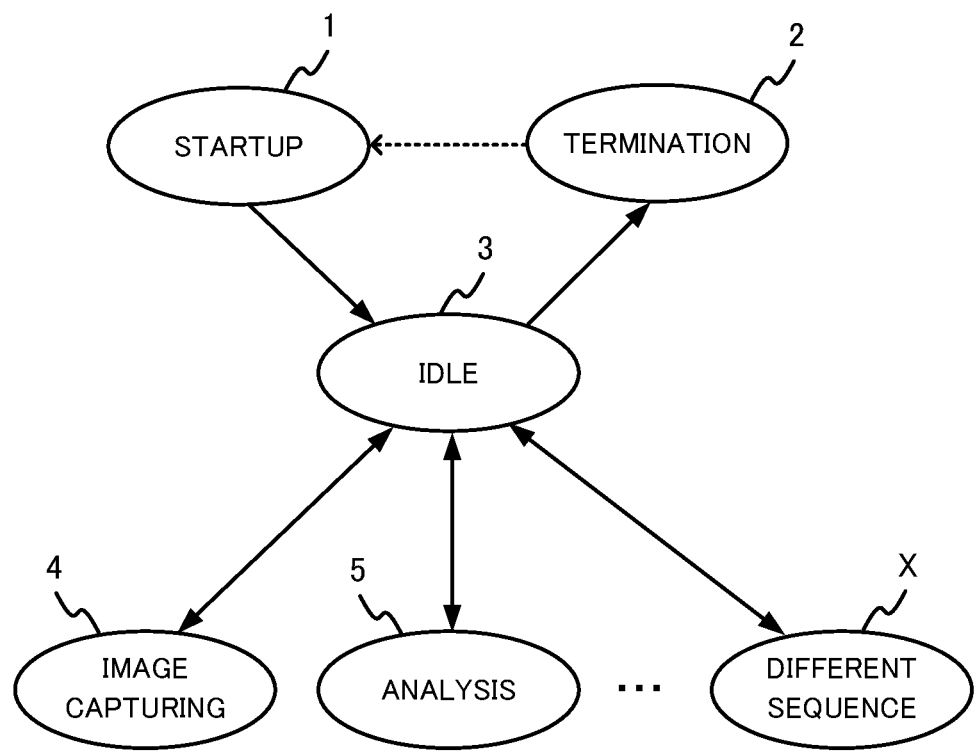
FIG. 3 is an explanatory diagram of transition of the operation state of the system.

FIG. 3 is an explanatory diagram of transition of the operation state of the system 100. Operation states to which the system 100 can transition will be described in further detail below with reference to FIG. 3.

As described above, the system 100 can transition to any of at least three operation states including the plurality of operation states corresponding to the plurality of pieces of sequence processing and an operation state different therefrom. The operation state different therefrom in the at least three operation states corresponds to the state from termination of a piece of sequence processing until the next piece of sequence processing starts. Hereinafter, the operation state 3 is referred to as an idle state as illustrated in FIG. 3. The idle state enables the user to make various operations to the system 100. Typically, various types of setting for sequence processing are conducted in the idle state immediately before the sequence processing.

Meanwhile, as illustrated in FIG. 3, examples of an operation state corresponding to a piece of sequence processing include an operation state 1 corresponding to startup processing (hereinafter, referred to as a startup state), an operation state 2 corresponding to termination processing (hereinafter, referred to as a termination state), and an operation state corresponding to a piece of sequence processing different therefrom (operation state 4, operation state 5, . . . , or operation state X).

Examples of an operation state corresponding to a piece of sequence processing different from the startup state and the termination state include an operation state 4 corresponding to image capturing processing (hereinafter, referred to as an image capturing state) and an operation state 5 corresponding to analysis processing (hereinafter, referred to as an analysis state). In addition, included may be an operation state corresponding to live image capturing processing and an operation state corresponding to setup adjustment processing.

Such operation states corresponding to pieces of sequence processing different from the startup state and the termination state are identical in that the operation states before and after transition in state are each the idle state. In contrast to this, the startup state (operation state 1) transitions to the idle state after startup processing and is particular in that the operation state immediately before startup processing is the termination state. The termination state (operation state 2) results from transition from the idle state and is particular in that the operation state after termination processing is the startup state at the time of next startup.

Figure 4:
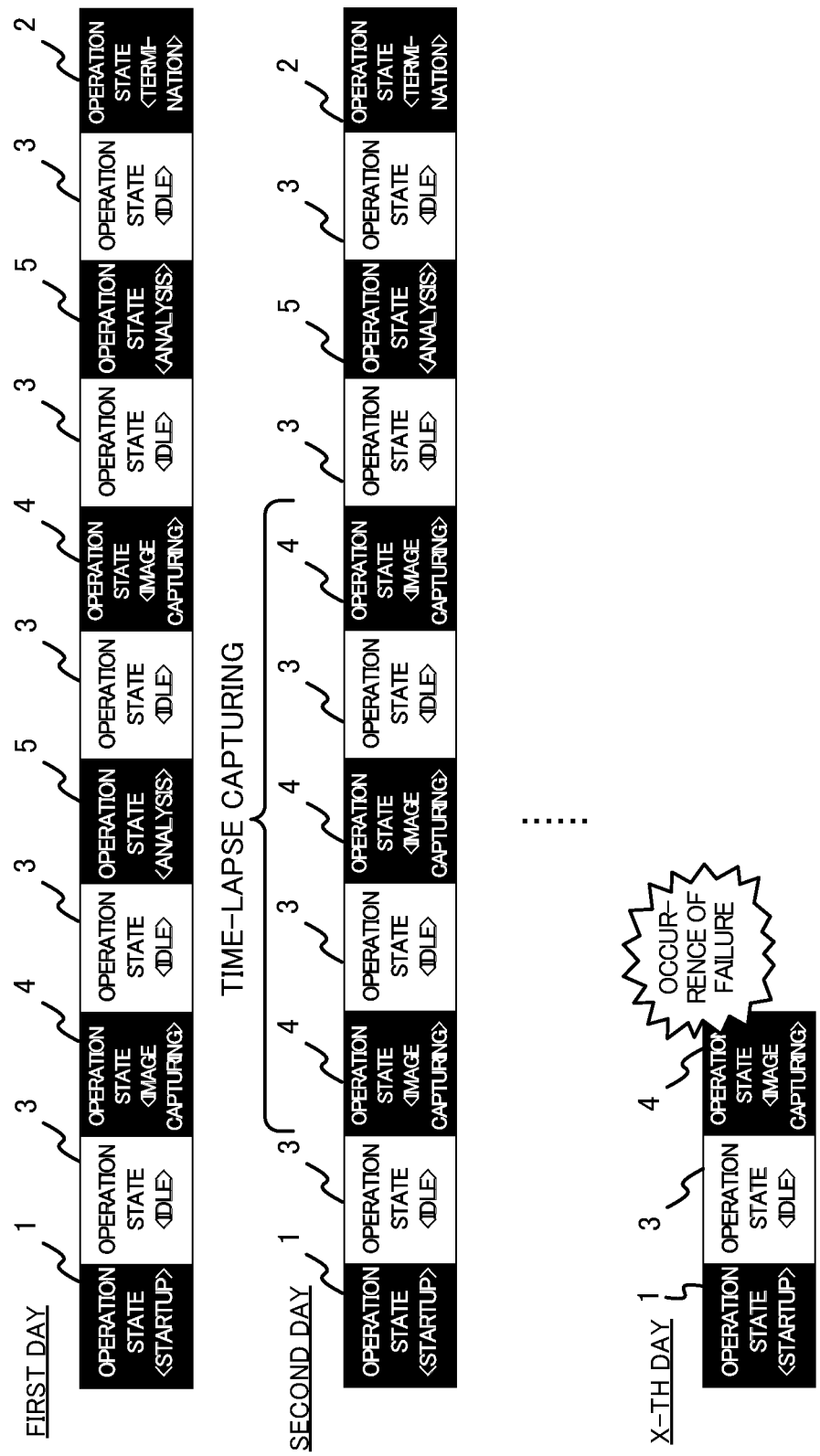
FIG. 4 illustrates an exemplary history of the operation state of the system.
Figure 5:
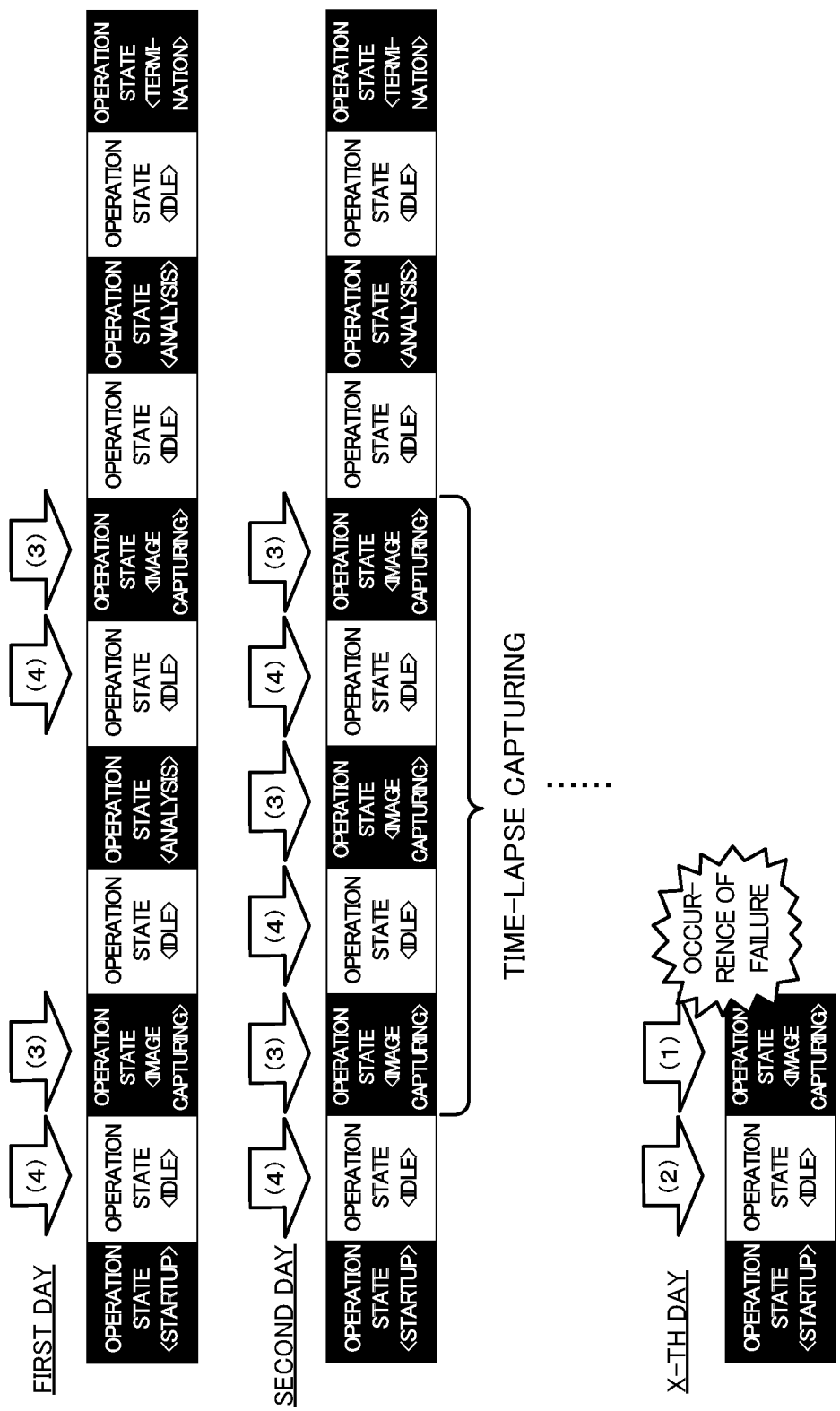
FIG. 5 explanatorily illustrates the order of priority of information to be sent to a support division at the time of occurrence of failure.

FIG. 4 illustrates an exemplary history of the operation state of the system 100. FIG. 5 explanatorily illustrates the order of priority of information to be sent to the support division at the time of occurrence of failure. With exemplary transition of the state of the system 100 until failure occurs, a log to be extracted in order to specify the cause of the failure will be described below with reference to FIGS. 4 and 5.

Referring to FIG. 4, given is an example of occurrence of failure on the X-th day after the system 100 starts operating. In the example, on the first day, after startup, the system 100 performs repetition of image capturing and analysis and then terminates. On the second day, after startup, the system 100 performs time-lapse capturing and then performs analysis. After that, the system 100 terminates. Then, on the X-th day on which the failure has occurred, the system 100 detects the failure in the first image capturing processing after startup.

With the failure having occurred in such circumstances, a log to be extracted as the highest priority is the log recorded in the operation state at the time of occurrence of failure, including the log recorded at the time of occurrence of failure (namely, the log recorded in the first image capturing state on the X-th day, referring to the arrow (1) in FIG. 5).

This is because the log includes information on specific processing in which an error, leading to the failure, has occurred. Extraction of the log enables acquisition of the most fundamental information for specifying the cause of the failure.

As described below, in a case where a mechanism for causing an error dialog to be displayed at the time of occurrence of failure is provided, the user can be notified of the operation state at the time of occurrence of failure (or information corresponding uniquely to the operation state). On the basis of information designating a particular operation state, the log extraction unit 15 extracts a log in units of operation states such that the log includes information on an event having occurred in the particular operation state. In the system 100 providing such a function, the user only designates the operation state at the time of occurrence of failure, identified on the basis of verification of an error dialog, so that the log recorded in the operation state at the time of occurrence of failure can be extracted in units of operation states.

Log extraction based on only the operation state leads to not only extraction of the log recorded in the operation state at the time of occurrence of failure, including the log recorded at the time of occurrence of failure, to be given the highest priority (refer to the arrow (1) in FIG. 5) but also extraction of the log recorded in any operation state identical in type to the operation state at the time of occurrence of failure, including no log recorded at the time of occurrence of failure (namely, the log recorded in any image capturing state from the first day to the (X−1)-th day, referring to the arrows (3) in FIG. 5). Thus, the log extraction unit 15 may extract only the log recorded in the latest state in the designated operation state. This results in a further reduction in the volume of log to be extracted.

Note that, in a case where the timing at which the log extraction unit 15 extracts a log is not necessarily immediately after occurrence of failure, desirably, the log extraction unit 15 extracts the log in the designated operation state, in addition to the log in the latest state. This results in reliable extraction of the log in the operation state at the time of occurrence of failure, including the log recorded at the time of occurrence of failure. Extracted may be the log in the designated operation state recorded within a predetermined period from the present (e.g., a few days or a few weeks). In this case, the log recorded at the time of occurrence of failure can be substantially prevented from not being extracted.

It should be noted that comparison of the log in any operation state identical in type to the operation state at the time of occurrence of failure, including no log recorded at the time of occurrence of failure (refer to the arrows (3) in FIG. 5) with the log in the operation state at the time of occurrence of failure, including the log recorded at the time of occurrence of failure (refer to the arrow (1) in FIG. 5) may be useful for specifying the cause of failure. An operation state identical in type to the operation state at the time of occurrence of failure may have a minor failure having no influence on continuation of processing. Thus, analysis of the log in any operation state identical in type to the operation state at the time of occurrence of failure may lead to prompt specification of the cause of failure preventing continuation of processing. Therefore, in a case where specifying the operation state enables a sufficient reduction in the volume of data, desirably, the log extraction unit 15 extracts a log such that the log includes the log in any operation state identical in type to the operation state at the time of occurrence of failure, including no log recorded at the time of occurrence of failure (refer to the arrows (3) in FIG. 5), together with the log in the operation state at the time of occurrence of failure, including the log recorded at the time of occurrence of failure (refer to the arrow (1) in FIG. 5).

A log to be extracted as the priority next to the highest-priority log described above (refer to the arrow (1) in FIG. 5) is the log recorded in the operation state immediately before occurrence of failure (namely, the log recorded in the idle state immediately before the first image capturing state on the X-th day, referring to the arrow (2) in FIG. 5).

Like the example, in a case where an error has occurred in an operation state corresponding to a piece of sequence processing, the cause of the error or a clue to the error is, not infrequently, included in the operation state immediately therebefore. Specifically, the operation state immediately before any operation state other than the startup state from among the operation states corresponding to the pieces of sequence processing is the idle state. Due to the setting in the idle state, failure may occur in the operation state thereafter. In the startup processing, initialization processing is performed, for example, with reading of a setting file created in the termination processing. If failure occurs in the startup processing, for example, the cause is the termination processing because of the damage of a file created in the termination processing.

In the system 100, the user only designates the operation state at the time of occurrence of failure, so that the log in the operation state at the time of occurrence of failure can be extracted in units of operation states. Therefore, the log recorded in the operation state immediately therebefore can be also extracted in units of operation states. This enables a grasp of with which sort of setting sequence processing has been performed at the time of occurrence of failure. Thus, useful information for specifying the cause of failure can be acquired.

It should be noted that, in a case where the log extraction unit 15 extracts the log in any operation state identical in type to the operation state at the time of occurrence of failure, including no log recorded at the time of occurrence of failure (namely, the log recorded in any image capturing state from the first day to the (X–1)-th day, referring to the arrows (3) in FIG. 5), together with the log in the operation state at the time of occurrence of failure, including the log recorded at the time of occurrence of failure (refer to the arrow (1) in FIG. 5), the log extraction unit 15 extracts, in addition to the log recorded in the operation state immediately before occurrence of failure (refer to the arrow (2) in FIG. 5), the other logs recorded in the operation state immediately before switching to the operation state at the time of occurrence of failure (refer to the arrows (4) in FIG. 5). This enables acquisition of information for more detail comparison between normality and abnormality.

Figure 7:
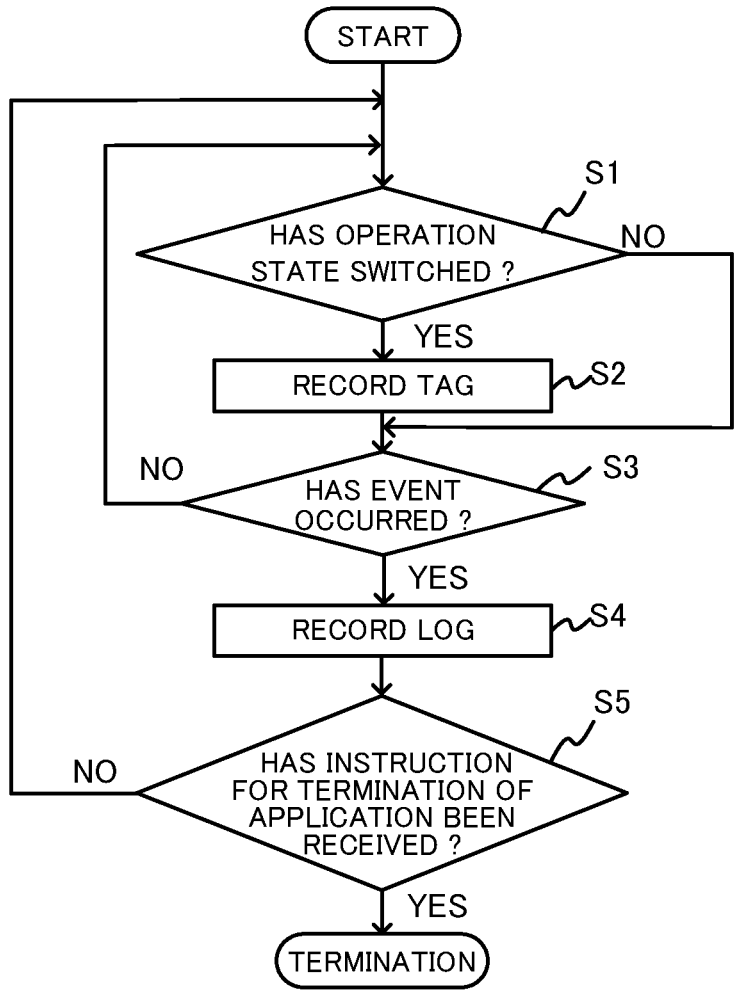
FIG. 7 is an exemplary flowchart of log recording processing.
Figure 9:
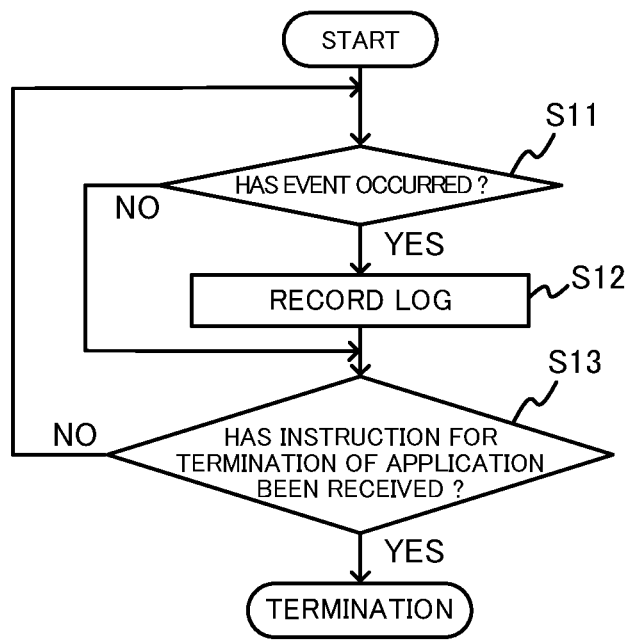
FIG. 9 is another exemplary flowchart of log recording processing.

FIG. 6 illustrates an exemplary configuration of a log file. FIG. 7 is an exemplary flowchart of log recording processing. FIG. 8 illustrates an exemplary configuration of another log file. FIG. 9 is another exemplary flowchart of log recording processing. The structure of a log file enabling log extraction in units of operation states and a method of creating the log file will be described below with reference to FIGS. 6 to 9.

As illustrated in FIG. 6, for example, while recording, into a log file 18a, a log in chronological order, the log recording unit 12 may record, in response to a switch in the operation state of the system 100, a tag as information indicating the operation state of the system 100 into the log file 18a. Thus, with such tags as boundaries, logs are segmented in units of operation states. Thus, with tags as guides, the log extraction unit 15 can easily extract a log in units of operation states from the log file 18a. It should be noted that, desirably, the notation of a tag is distinguishable from that of a log. Hereinafter, the notation <operation state> will be exemplified for a tag in order to achieve the distinction between tag and log, but this is not limiting.

For example, the log recording unit 12 performs processing illustrated in FIG. 7, so that the log file 18a having a structure illustrated in FIG. 6 can be created. That is, the log recording unit 12 determines whether or not the operation state has switched (step S1). When determining that the operation state has switched (YES in step S1), the log recording unit 12 records, into the log file 18a, a tag indicating the operation state after switching (step S2). After recording the tag or when determining that the operation state has not switched (NO in step S1), the log recording unit 12 determines whether or not an event has occurred (step S3). When determining that no event has occurred (NO in step S3), the log recording unit 12 performs, again, the processing from step S1. Meanwhile, when determining that an event has occurred (YES in step S3), the log recording unit 12 records, into the log file 18a, a log regarding information on the event (step S4). The above processing is repeated until the application 11 terminates (YES in step S5).

As above, given has been the example in which, in a case where it is determined that the operation state has switched, a tag indicating the operation state after switching is recorded. However, a tag indicating the operation state before switching may be recorded or a tag indicating both of the operation state before switching and the operation state after switching may be recorded. Even in either of the cases, a log file is created such that logs are segmented in units of operation states with tags as boundaries, so that a similar effect can be acquired.

As illustrated in FIG. 8, for example, while recording, into a log file 18b, a log in chronological order, the log recording unit 12 may record, into the log file 18b, a log together with a tag as information indicating the operation state of the system 100 at the point in time of occurrence of an event corresponding to the log. This enables easy specification of which logs have been recorded in the same operation state. Therefore, while sensing variations in tag, the log extraction unit 15 scans the log file, so that a log can be easily extracted in units of operation states.

For example, the log recording unit 12 performs processing illustrated in FIG. 9, so that the log file 18b having a structure illustrated in FIG. 8 can be created. That is, the log recording unit 12 performs monitoring for occurrence of an event (step S11). When an event occurs (YES in step S11), the log recording unit 12 records, into the log file 18b, a log regarding information on the event (step S12). The above processing is repeated until the application 11 terminates (YES in step S13).

Figure 10:
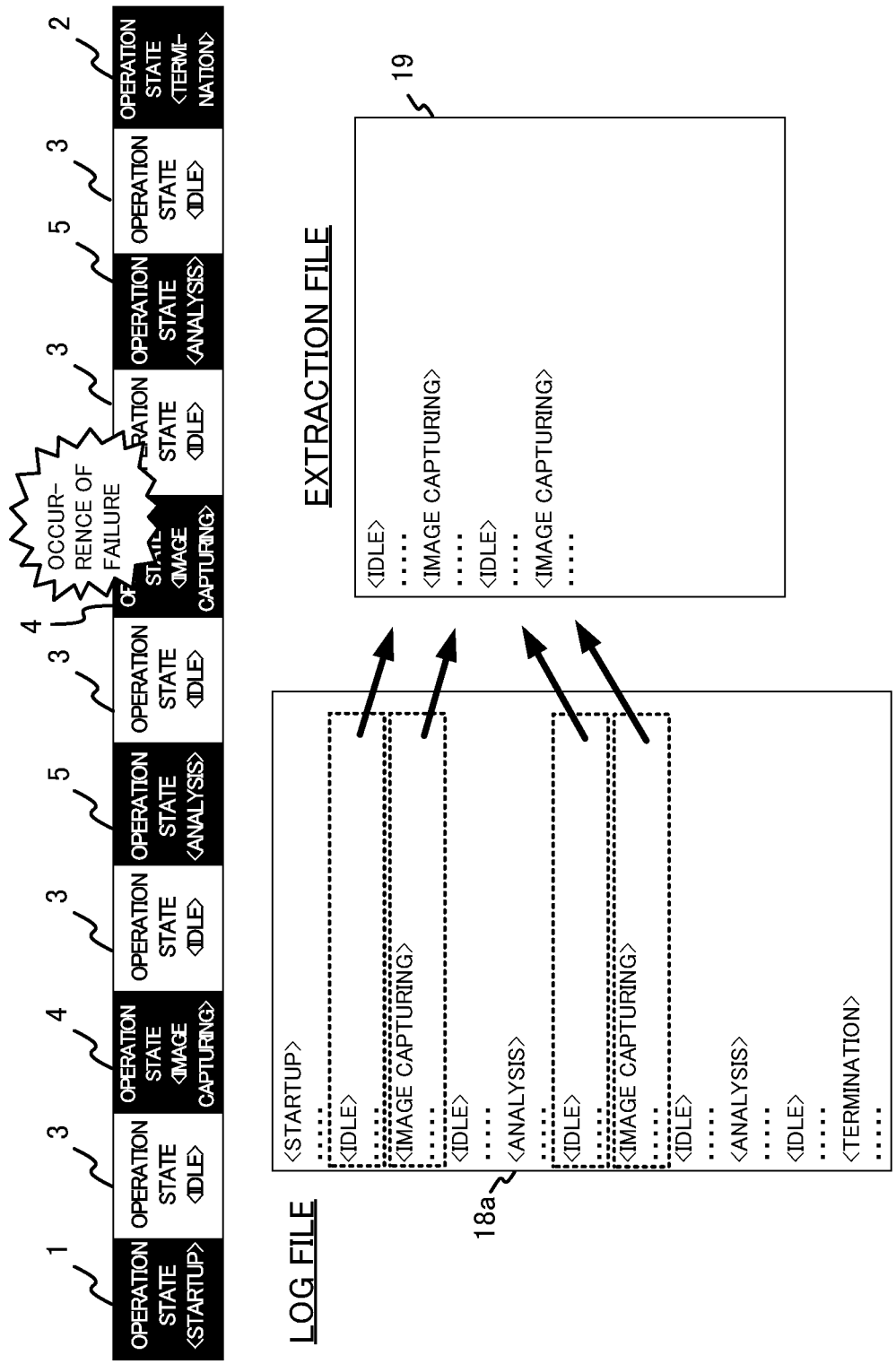
FIG. 10 illustrates a phase of extraction of a log from a log file to an extraction file.

FIG. 10 illustrates a phase of extraction of a log from a log file to an extraction file. A method of creating an extraction file will be described below with reference to FIG. 10.

In the system 100, as illustrated in FIG. 10, the log recording unit 12 records logs into the log file 18a in advance in a suitable format to log extraction in units of operation states. Thus, for example, as illustrated in FIG. 10, in a case where failure has occurred in the image capturing state, only designation of the image capturing state as a particular operation state enables the log extraction unit 15 to extract a log in units of operation states, easily, on the basis of information designating the particular operation state (image capturing state). Specifically, for example, as illustrated in FIG. 10, the log extraction unit 15 extracts, from the log file 18a, a log in units of operation states of the system 100 such that the log includes a first log as information on an event having occurred in the particular operation state (image capturing state) and a second log as information on an event having occurred in the operation state (idle state) immediately before switching to the particular operation state, creating an extraction file 19.

Therefore, the system 100 enables easy extraction of a proper volume of log necessary for investigation of the cause of occurrence of failure, to the extraction file 19. Then, use of the extraction file 19 enables a reduction in the volume of data of a file to be interchanged with the support division.

Specific examples of processing in the system 100 described above will be described below as first to fourth embodiments.

First Embodiment

Figure 11:
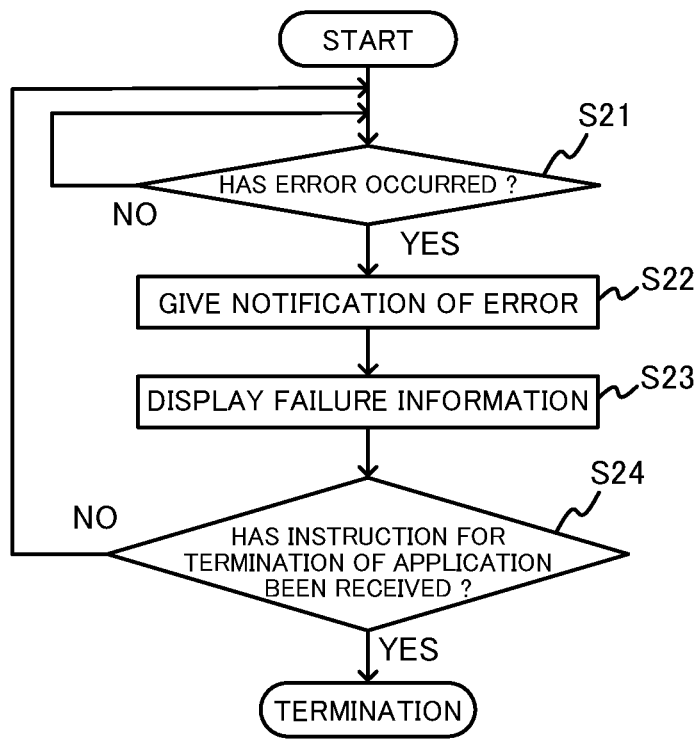
FIG. 11 is an exemplary flowchart of error monitoring processing according to a first embodiment.
Figure 12:
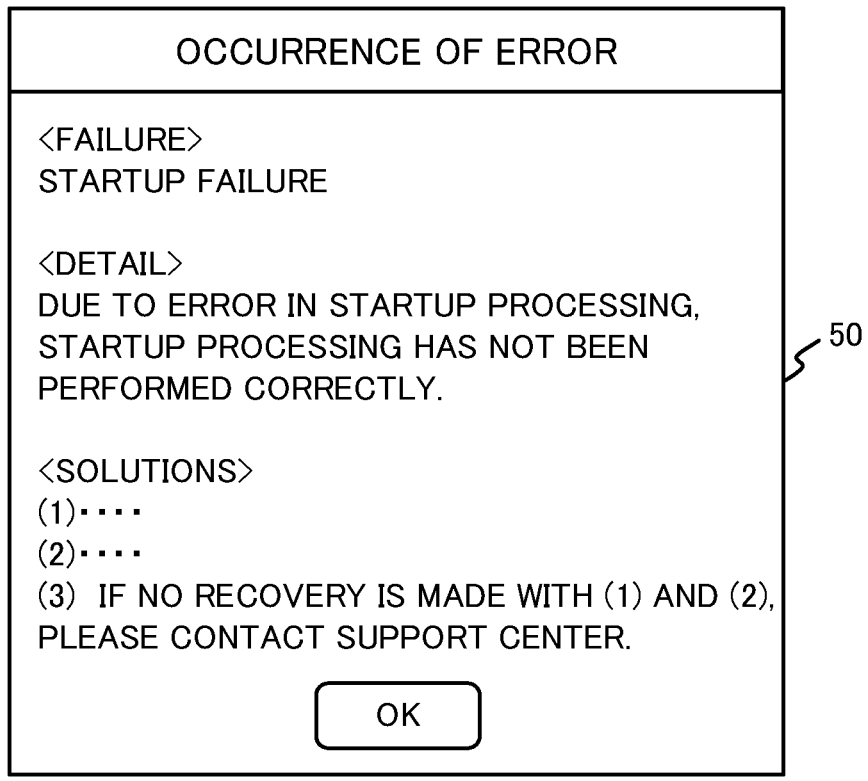
FIG. 12 illustrates an exemplary error dialog.
Figure 13:
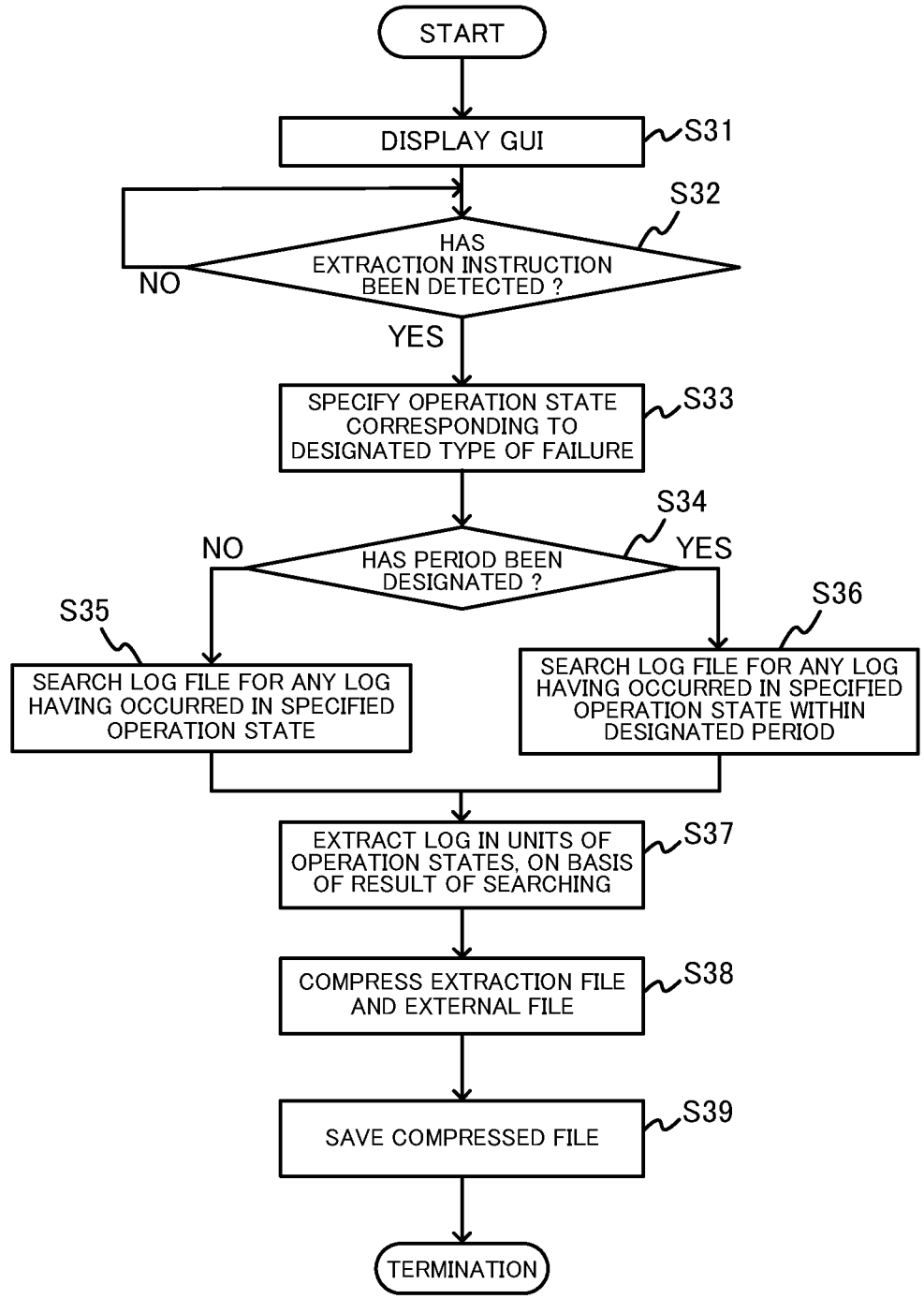
FIG. 13 is an exemplary flowchart of log extraction processing according to the first embodiment.
Figure 14:
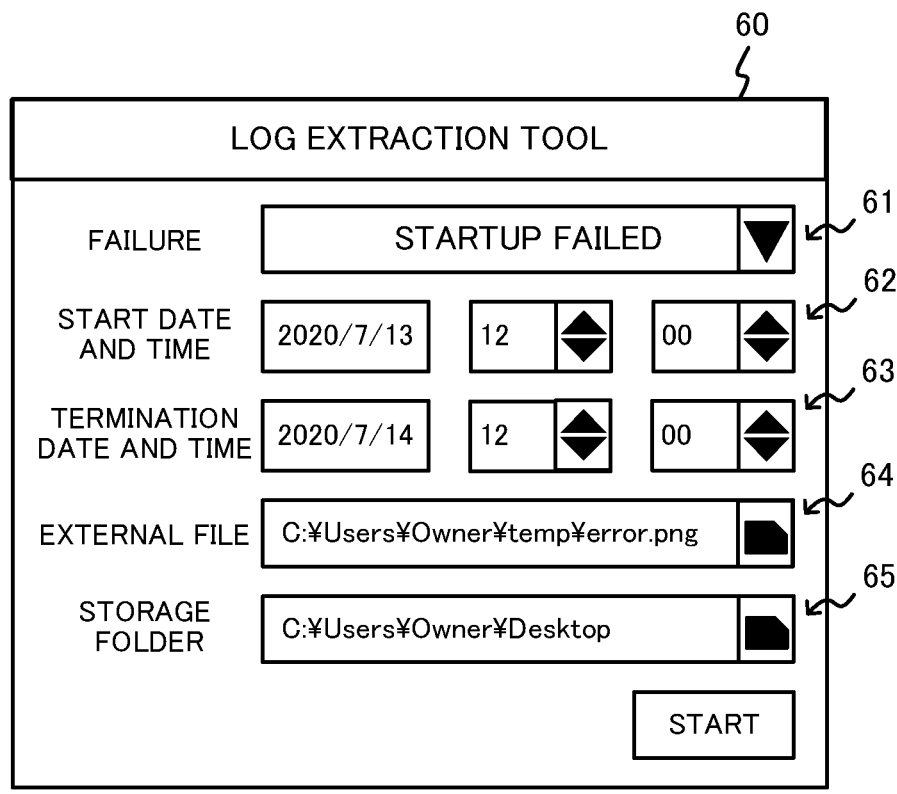
FIG. 14 illustrates an exemplary GUI of a log extraction tool.

FIG. 11 is an exemplary flowchart of error monitoring processing according to the present embodiment. FIG. 12 illustrates an exemplary error dialog. FIG. 13 is an exemplary flowchart of log extraction processing according to the present embodiment. FIG. 14 illustrates an exemplary GUI of a log extraction tool. FIG. 15 is an exemplary correspondence table between failure and operation state. The present embodiment corresponds to an example in which a log is extracted in accordance with a command given by the user. The first embodiment of the present invention will be described below with reference to FIGS. 11 to 15.

The control device 10 performs error monitoring processing illustrated in FIG. 11 at all times. When the error monitoring processing starts, the error detection unit 13 performs monitoring for occurrence of an error (step S21). Then, when detecting an error (YES in step S21), the error detection unit 13 notifies the log recording unit 12 of the error (step S22) and causes the display unit 14 to display failure information as information regarding failure due to the error detected by the error detection unit 13 (step S23). Herein, for example, the display unit 14 displays a dialog 50 illustrated in FIG. 12.

On the dialog 50 illustrated in FIG. 12, displayed is "startup failure" as information indicating the type of the failure. In addition, displayed are the detail of startup failure and solutions to the failure. Furthermore, for example, displayed may be the time of the occurrence of the error. The user can grasp the type of the failure by verifying the dialog 50. In addition, the user can grasp handling to be conducted.

In response to display of the failure information, until an instruction for termination of the application is received (YES in step S24), the control device 10 repeats the processing from step S21 to step S24.

When identifying the occurrence of the failure through the dialog 50, the user starts up a log extraction tool in order to extract, from the log file, a log to be sent to the support division. In response to startup of the log extraction tool, the control device 10 performs log extraction processing illustrated in FIG. 13.

When the log extraction processing starts, the log extraction unit 15 causes the display unit 14 to display a GUI (step S31). Herein, for example, the display unit 14 displays a GUI 60 illustrated in FIG. 14. The GUI 60 includes a GUI component 61, a GUI component 62, a GUI component 63, a GUI component 64, and a GUI component 65.

The GUI component 61 serves as a GUI component for designating a type of failure. The user can designate a type of failure with the GUI component 61. Specifically, the user is required to select the type of the failure displayed on the dialog 50, with the GUI component 61. Alternatively, the type of the latest failure may be displayed in advance.

The GUI component 62 and the GUI component 63 serve as a GUI component for designating a period. With the GUI component 62 and the GUI component 63, the user can designate a period for a log to be extracted such that the period includes the time of the occurrence of the failure.

The GUI component 64 serves as a GUI component for designating the path to a file to be compressed together with the extraction file. For example, in order to send, to the support division, a snapshot at the time of occurrence of an error, an OS log, and a setting file for hardware together with the extracted log, the user can designate the paths thereto, with the GUI component 64.

The GUI component 65 serves as a GUI component for designating a path to save a compressed file including the extraction file. With the GUI component 65, the user can designate a destination to save the compressed file resulting from compression of a folder having the extraction file and any file designated with the GUI component 64, inside.

Then, when the user gives an instruction for log extraction after making necessary designations, the log extraction unit 15 detects the extraction instruction (YES in step S32). In response to detection of the extraction instruction, the log extraction unit 15 next specifies the operation state corresponding to the designated type of failure (step S33). Herein, for example, with reference to a correspondence table T1, illustrated in FIG. 15, prepared in advance, the log extraction unit 15 specifies the operation state corresponding to the failure.

In response to specification of the corresponding operation state, the log extraction unit 15 determines whether or not a period has been designated for log extraction (step S34). In a case where no period has been designated (NO in step S34), the log extraction unit 15 searches the log file for any log having occurred in the operation state specified in step S33 (step S35), and extracts a log in units of operation states, on the basis of a result of searching (step S37). That is, on the basis of information designating the operation state of the system 100 corresponding to the type of failure designated with the GUI component 61, the log extraction unit 15 extracts, from the log file, a log in units of operation states. It should be noted that a log to be extracted is required to include information on an event having occurred in the operation state corresponding to the designated type of failure, more desirably, includes information on an event having occurred in the operation state immediately before switching to the operation state corresponding to the designated type of failure.

In a case where a period has been designated (YES in step S34), the log extraction unit 15 searches the log file for any log having occurred in the operation state specified in step S33 within the designated period (step S36), and extracts a log in units of operation states, on the basis of a result of searching (step S37). That is, on the basis of the information designating the operation state of the system 100 corresponding to the type of failure designated with the GUI component 61 and the period designated with the GUI component 62 and the GUI component 63, the log extraction unit 15 extracts, from the log file, a log in units of operation states.

After log extraction, the log extraction unit 15 compresses the extraction file including the extracted log and any external file designated with the GUI component 64 (step S38) and then saves the created compressed file to the path designated with the GUI component 65 (step S39).

The control device 10 performs the processing illustrated in FIG. 13, so that information necessary for specification of the cause of the failure is extracted into an extraction file and then the extraction file is automatically compressed. Thus, the user only uploads the compressed file to the server 200, so that a proper amount of necessary information with a reduction in the volume of data can be easily provided to the support division. It should be noted that advance permission from the user may cause the control device 10 to operate such that, after creation of a compressed file, the transmission unit 17 automatically uploads the compressed file to the server 200.

Second Embodiment

Figure 16:
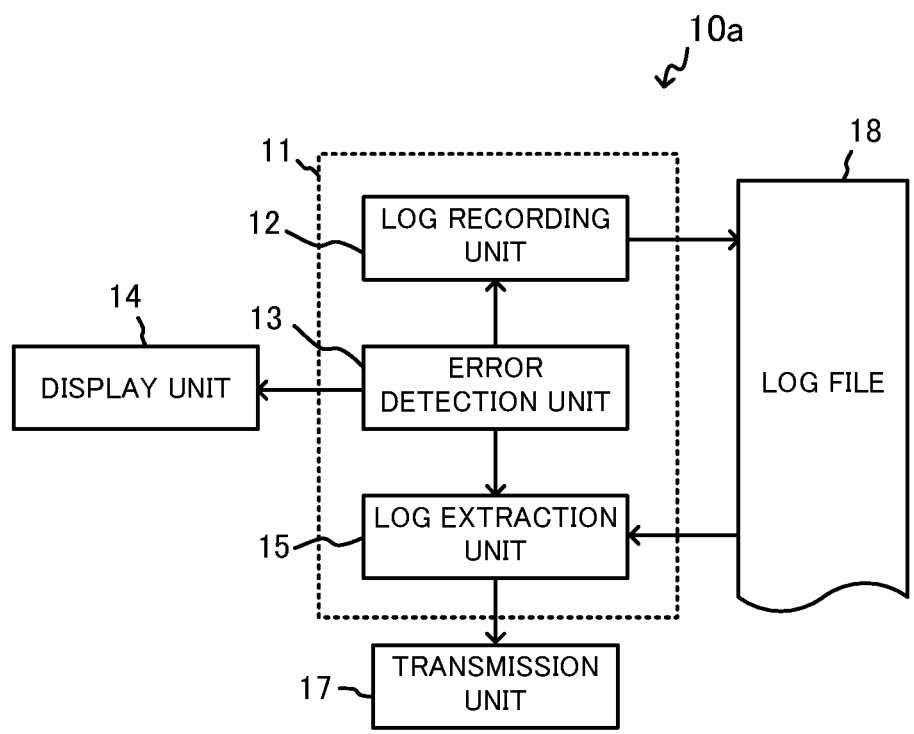
FIG. 16 illustrates an exemplary functional configuration of another control device.
Figure 17:
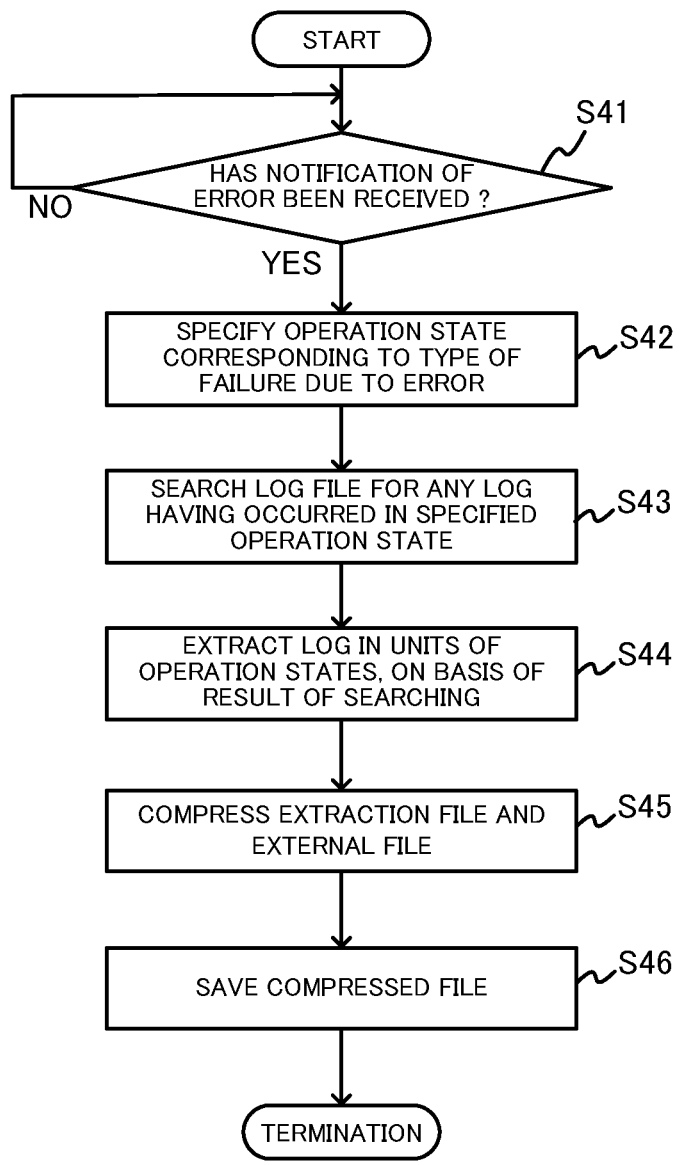
FIG. 17 is an exemplary flowchart of log extraction processing according to a second embodiment.

FIG. 16 illustrates an exemplary functional configuration of a control device 10a. FIG. 17 is an exemplary flowchart of log extraction processing according to the present embodiment. The present embodiment corresponds to an example in which a control device automatically extracts a log. The second embodiment of the present invention will be described below with reference to FIGS. 16 and 17.

The present embodiment is different from the first embodiment in that a system 100 includes the control device 10a illustrated in FIG. 16 instead of a control device 10 and the log extraction processing illustrated in FIG. 17 is performed instead of the log extraction processing illustrated in FIG. 13. Except that point, the present embodiment is similar to the first embodiment.

As illustrated in FIG. 16, the control device 10a is different from the control device 10 in that an error detection unit 13 notifies a log extraction unit 15 of an error because no input unit 16 is provided. The log extraction unit 15 may be included together with a log recording unit 12 and the error detection unit 13 in a common application 11.

When the log extraction processing illustrated in FIG. 17 starts, the log extraction unit 15 monitors the error detection unit 13 for notification of an error (step S41). When detecting an error (YES in step S41), the log extraction unit 15 specifies the operation state corresponding to the type of failure due to the error (step S42). Herein, for example, with reference to the correspondence table T1 illustrated in FIG. 15, the log extraction unit 15 specifies the operation state corresponding to the failure.

In response to specification of the corresponding operation state, the log extraction unit 15 searches the log file for any log having occurred in the operation state specified in step S42 (step S43), and extracts a log in units of operation states, on the basis of a result of searching (step S44). That is, on the basis of information designating the operation state of the system 100 corresponding to the type of the failure due to the error detected by the error detection unit 13, the log extraction unit 15 extracts, from the log file, a log in units of operation states. It should be noted that a log to be extracted is required to include information on an event having occurred in the specified operation state, more desirably, includes information on an event having occurred in the operation state immediately before switching to the specified operation state.

After log extraction, the log extraction unit 15 compresses the extraction file and an external file determined in advance for each type of failure (step S45) and saves the created compressed file to a predetermined path (step S46).

The control device 10a performs the processing illustrated in FIG. 17. Even if failure occurs, the user does not need any particular operation, and the control device 10a automatically extracts information necessary for specification of the cause of the failure into an extraction file and then automatically compresses the extraction file. Thus, similarly to the first embodiment, the user only uploads the compressed file to the server 200, so that a proper amount of necessary information with a reduction in the volume of data can be easily provided to the support division. Because the work of log extraction is automatically performed, a further reduction in burden on the user can be made than in the first embodiment. It should be noted that, similarly to the first embodiment, the compressed file may be automatically uploaded.

Third Embodiment

Figure 18:
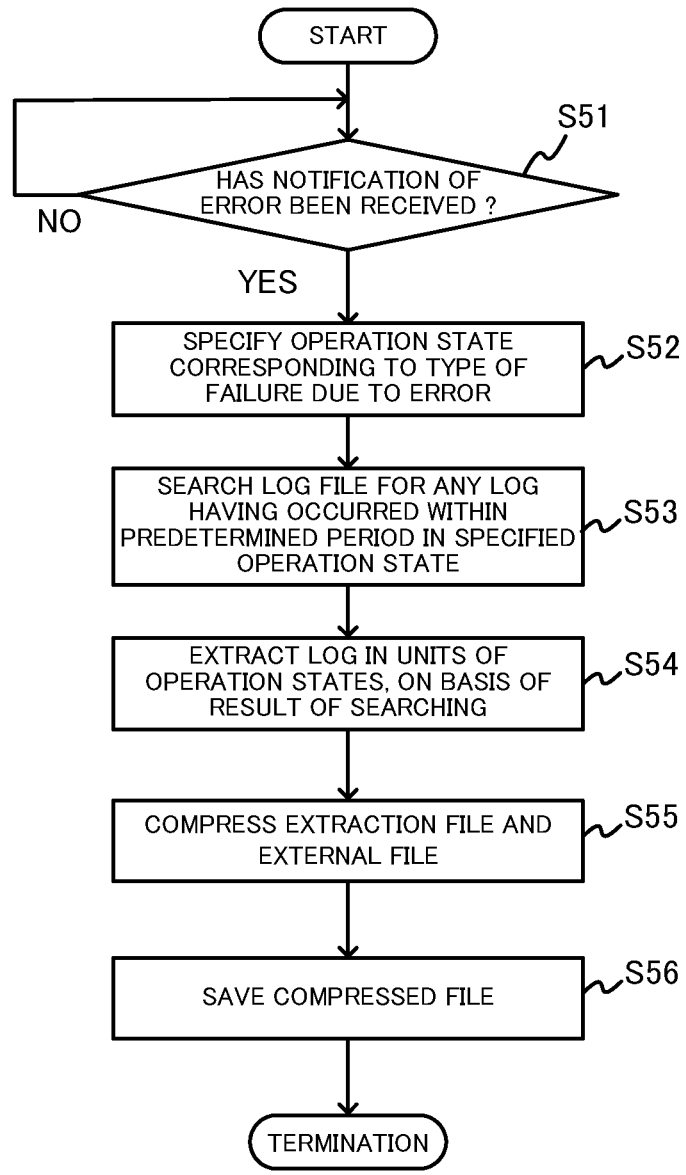
FIG. 18 is an exemplary flowchart of log extraction processing according to a third embodiment.

FIG. 18 is an exemplary flowchart of log extraction processing according to the present embodiment. Similarly to the second embodiment, the present embodiment corresponds to an example in which a control device automatically extracts a log. The third embodiment of the present invention will be described below with reference to FIG. 18.

In the log extraction processing according to the second embodiment, in step S43, the log extraction unit 15 extracts a log, on the basis of information designating the operation state of the system 100 corresponding to the type of the failure. In the log extraction processing according to the present embodiment, in step S53, the log extraction unit 15 extracts a log, on the basis of information designating the operation state of the system 100 corresponding to the type of the failure and the time of the occurrence of the error. Except that point, the present embodiment is similar to the second embodiment. That is, the processing in step S51 and step S52 and the processing from step S54 to step S56 in FIG. 18 are similar to the processing in step S41 and step S42 and the processing from step S44 to step S46 in FIG. 17, respectively.

In the present embodiment, because a log is automatically extracted in response to occurrence of an error, the log extraction unit 15 grasps the time of the occurrence of the error. Thus, the log extraction unit 15 can extract a log in consideration of the time of the occurrence of the error having caused failure. Specifically, for example, the log extraction unit 15 may extract a log in units of operation states such that, from information on the events having occurred in the operation state corresponding to the type of the failure, the log includes information on any event having occurred after the time of the latest switching to the corresponding operation state, but before the time of the occurrence of the error.

According to the present embodiment, a period for a log to be extracted can be narrowed down with the time of the occurrence of the error. Thus, a further reduction can be made in the volume of a log to be extracted than in the second embodiment.

Fourth Embodiment

Figure 19:
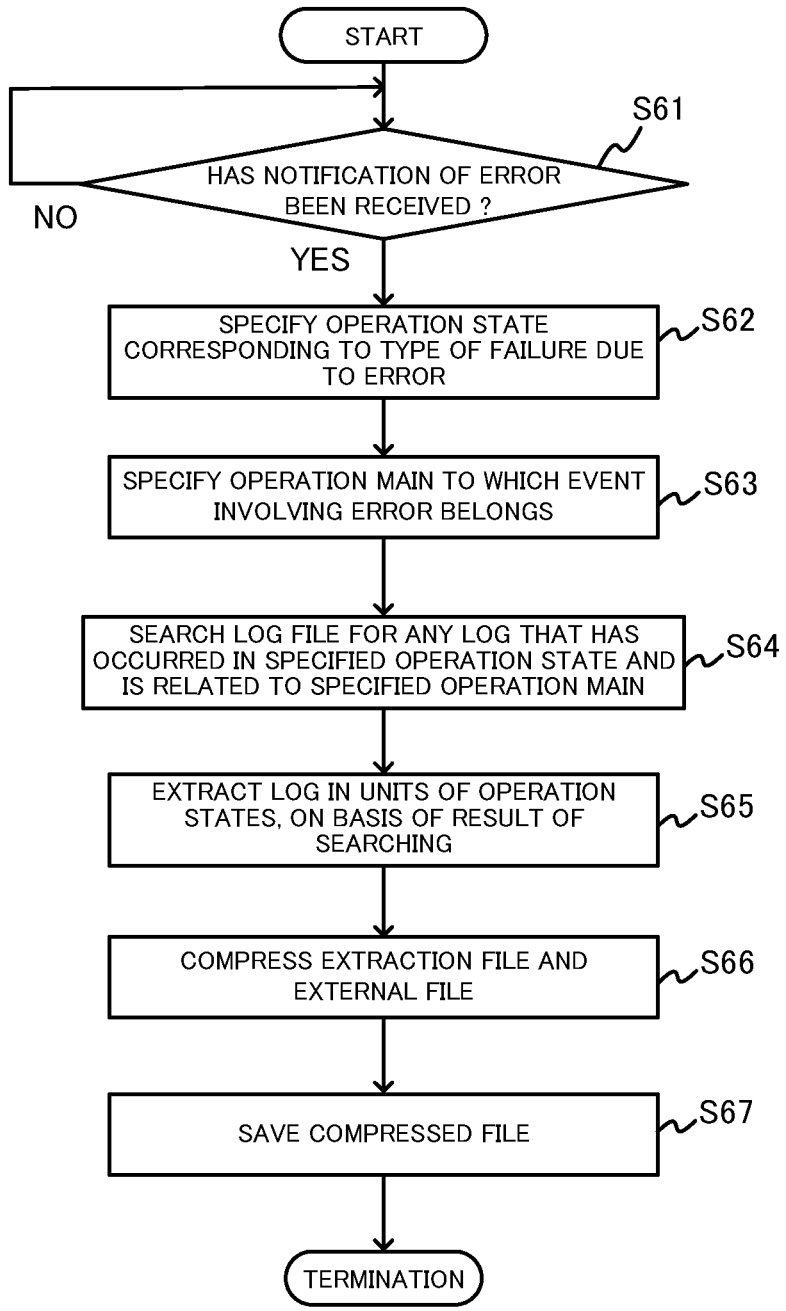
FIG. 19 is an exemplary flowchart of log extraction processing according to a fourth embodiment.

FIG. 19 is an exemplary flowchart of log extraction processing according to the present embodiment. Similarly to the second embodiment and the third embodiment, the present embodiment corresponds to an example in which a control device automatically extracts a log. The fourth embodiment of the present invention will be described below with reference to FIG. 19.

The processing in step S61 and step S62 in the log extraction processing according to the present embodiment is similar to the processing in step S41 and step S42 in FIG. 17. The log extraction processing according to the present embodiment is different from the log extraction processing according to the second embodiment in that, in step S63, the operation main to which the event involving the error belongs is specified. It should be noted that, for example, the error detection unit 13 may specify the operation main to which the event involving the error belongs, or the log extraction unit 15 may be notified of information thereon, so that the log extraction unit 15 specifies the operation main.

Then, the log extraction unit 15 searches the log file for any log that has occurred in the operation state specified in step S62 and is related to the operation main specified in step S63 (step S64) and extracts a log in units of operation states, on the basis of a result of searching (step S65). That is, on the basis of information designating the operation state of the system 100 corresponding to the type of the failure due to the error detected by the error detection unit 13 and information on the operation main specified by the error detection unit 13, the log extraction unit 15 extracts, from the log file, a log in units of operation states.

After log extraction, the log extraction unit 15 compresses the extraction file including the extracted log and an external file determined in advance for each type of failure (step S66) and saves the created compressed file to a predetermined path (step S67).

According to the present embodiment, a log to be extracted can be narrowed down on the basis of the operation main to which the event involving an error belongs. Thus, a further reduction can be made in the volume of a log to be extracted than in the second embodiment.

As above, given has been the example in which a log is extracted from a log file including text data to create an extraction file. However, the log extraction unit 15 may extract an image together with an extraction file. For example, as illustrated in FIG. 20, the log recording unit 12 may record, into a log file 18c, the path to an image related to sequence processing. That is, the log recording unit 12 may record, into the log file 18c, information regarding an image related to sequence processing such that the operation state of the system corresponding to the sequence processing related to the image can be specified. Then, in a case where the path to an image is included in the log extracted from the log file 18c, the log extraction unit 15 may compress the image together with the extraction file including text data, to create a compressed file.

Figure 21:
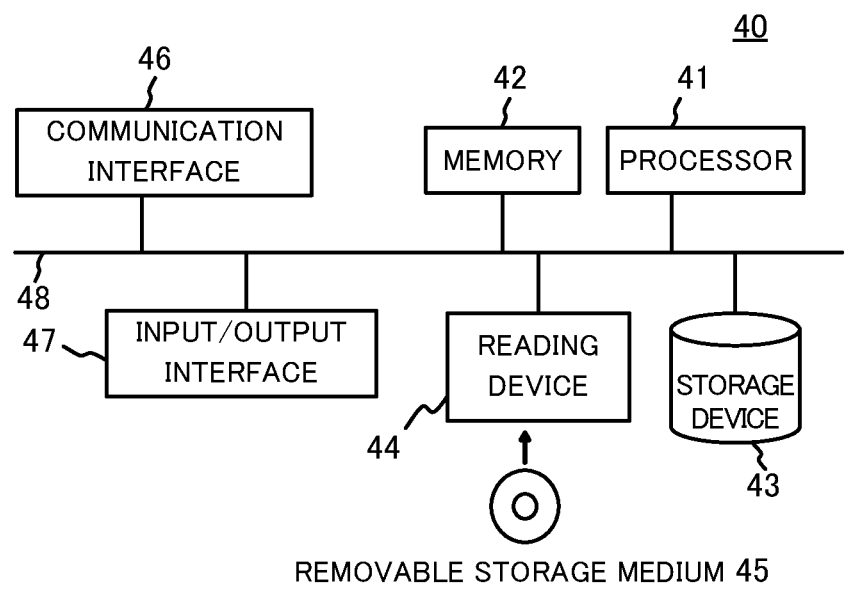
FIG. 21 illustrates an exemplary hardware configuration of a computer for achieving the control device.

FIG. 21 illustrates an exemplary hardware configuration of a computer 40 for achieving the control device 10 according to the embodiment described above. As illustrated in FIG. 21, the computer 40 includes, as its hardware configuration, a processor 41, a memory 42, a storage device 43, a reading device 44, a communication interface 46, and an input/output interface 47. It should be noted that the processor 41, the memory 42, the storage device 43, the reading device 44, the communication interface 46, and the input/output interface 47 are mutually connected, for example, through a bus 48.

For example, the processor 41 may be a single processor, a multiprocessor, or a multi-core processor. The processor 41 reads out and executes a program stored in the storage device 43, to operate as the log recording unit 12, the error detection unit 13, and the log extraction unit 15 described above.

For example, the memory 42 is a semiconductor memory and may include a RAM area and a ROM area. For example, the storage device 43 is a hard disk, a semiconductor memory, such as a flash memory, or an external storage device.

For example, the reading device 44 accesses a removable storage medium 45, in accordance with an instruction from the processor 41. For example, the removable storage medium 45 is achieved by a semiconductor device, a medium to or from which information is input or output due to a magnetic effect, or a medium to or from which information is input or output due to an optical effect. It should be noted that, for example, the semiconductor device is a universal serial bus (USB) memory. For example, the medium to or from which information is input or output due to a magnetic effect is a magnetic disk. For example, the medium to or from which information is input or output due to an optical effect is a compact disc (CD)-ROM, a digital versatile disc (DVD), a Blu-ray disc (Blu-ray is a registered trademark), or the like.

For example, the communication interface 46 communicates with a different device, in accordance with an instruction from the processor 41. For example, the input/output interface 47 serves as an interface between an input device and an output device. For example, the input device serves as a device that receives an instruction from the user, such as a keyboard, a mouse, or a touch panel. For example, the output device serves as a display device, such as a display, and a sound device, such as a speaker.

For example, the log file 18 described above may be included in the memory 42, the storage device 43, or the removable storage medium 45. The input unit 16 and the display unit 14 described above may include the input/output interface 47. The transmission unit 17 described above may include the communication interface 46.

For example, the program to be executed by the processor 41 is provided to the computer 40 in the following forms:
(1) Pre-installation on the storage device 43
(2) Provision from the removable storage medium 45
(3) Provision from a server, such as a program server.

It should be noted that the hardware configuration of the computer 40 for achieving the control device 10, described with reference to FIG. 21, is exemplary and thus embodiments are not limited to this. For example, the configuration described above may be partially deleted or may have a new constituent added thereto. In another embodiment, for example, part or the entirety of the function of the control device 10 described above may be implemented as hardware by a field programmable gate array (FPGA), a system-on-a-chip (SoC), an application specific integrated circuit (ASIC), or a programmable logic device (PLD).

The embodiments described above are specific examples for facilitating understanding of the invention, and thus the present invention is not limited to the embodiments. Modifications of the embodiments described above and alternative embodiments to the embodiments described above can be included. That is, in each embodiment, the constituent elements can be modified without departing from the spirit and scope thereof. Any appropriate combination of the plurality of constituent elements disclosed in at least one embodiment enables a new embodiment. Some constituent elements may be omitted from the constituent elements in each embodiment or some constituent elements may be added to the constituent elements in each embodiment. Furthermore, the procedure of processing in each embodiment may be changed in order as long as there is no contradiction. That is, the system, control device, log extraction method, computer-readable medium, and program according to the present invention can be variously modified or altered without departing from the scope of the claims.

As above, given has been an exemplary system including a controllable device and a control device. The control device may control itself, and the system may include only the control device. That is, the control device is required to control the system.

What is claimed is:

1. A system comprising a control device including a processor configured to:
   record a log into a log file, the log regarding information on an event having occurred in the system such that an operation state of the system at a point in time of the occurrence of the event is specified as a particular operation state of a plurality of different operation states, the plurality of different operation states corresponding to a plurality of pieces of sequence processing previously defined, the log further regarding information on the particular operation state; and
   extract the log from the log file, based on information designating the particular operation state, in units of operation states of the system such that the log includes the information on the event having occurred in the particular operation state.

2. The system according to claim 1,
wherein the processor is configured to extract the log from the log file, in units of operation states of the system such that the log includes a first log as the information on the event having occurred in the particular operation state and a second log as information on an event having occurred in an operation state immediately before switching to the particular operation state.

3. The system according to claim 1,
wherein the processor is configured to:
record the log into the log file, in chronological order; and
further record, at least in response to switching of the operation state of the system, into the log file, information indicating the operation state of the system.

4. The system according to claim 1,
wherein the processor is configured to record the log into the log file, in chronological order, together with information indicating the operation state of the system at the point in time of the occurrence of the event corresponding to the log.

5. The system according to claim 1,
wherein the processor is configured to:
detect an error having occurred in the system;
cause a display to display unit displays information regarding failure due to the error detected; and
cause the display to display a graphical user interface (GUI) including a first GUI component for designating a type of the failure,
wherein the information designating the particular operation state corresponds to information designating the operation state of the system corresponding to the type of the failure designated with the first GUI component.

6. The system according to claim 1,
wherein the processor is configured to:
detect an error having occurred in the system;
cause a display to display information regarding failure due to the error detected;
cause the display to display a graphical user interface (GUI) including a first GUI component for designating a type of the failure and a second GUI component for designating a period, wherein the information designating the particular operation state corresponds to information designating the operation state of the system corresponding to the type of the failure designated with the first GUI component; and
extract the log, based on the information designating the particular operation state and the period designated with the second GUI component.

7. The system according to claim 1,
wherein the processor is configured to detect an error having occurred in the system, and
wherein the information designating the particular operation state corresponds to information designating the operation state of the system corresponding to a type of failure due to the error detected by the processor.

8. The system according to claim 1,
wherein the processor is configured to:
detect an error having occurred in the system, the information designating the particular operation state corresponds to information designating the operation state of the system corresponding to a type of failure due to the error detected by the processor; and
extract the log, based on the information designating the particular operation state and time of the occurrence of the error.

9. The system according to claim 8,
wherein the processor is configured to extract, from the log file, the log in units of operation states of the system such that, from the information on the event having occurred in the particular operation state, the log includes information on an event having occurred after time of latest switching to the particular operation state, but before the time of the occurrence of the error.

10. The system according to claim 1,
wherein the processor is configured to detect an error having occurred in the system and specify an operation main to which an event involving the detected error belongs,
wherein the information designating the particular operation state corresponds to information designating the operation state of the system corresponding to a type of failure due to the error detected by the processor, and
wherein the processor is configured to extract the log, based on the information designating the particular operation state and information on the operation main specified by the processor.

11. The system according to claim 1, further comprising:
a transmission unit configured to transmit the extracted log to a storage device on a network.

12. The system according to claim 1,
wherein the processor further is configured to record, into the log file, information regarding an image related to a piece of sequence processing such that the operation state of the system corresponding to the piece of sequence processing related to the image is specified.

13. The system according to claim 1,
wherein the control device is configured to control a microscope, and
wherein the plurality of pieces of sequence processing include startup processing, image capturing processing, analysis processing, and termination processing.

14. A control device for a system,
the control device comprising a processor is configured to:
record a log into a log file, the log regarding information on an event having occurred in the system such that an operation state of the system at a point in time of the occurrence of the event is specified as a particular operation state of a plurality of different operation states, the plurality of different operation states corresponding to a plurality of pieces of sequence processing previously defined, the log further regarding information on the particular operation state; and
extract the log from the log file, based on information designating the particular operation state, in units of operation states of the system such that the log includes the information on the event having occurred in the particular operation state.

15. A log extraction method comprising:
recording a log into a log file, the log regarding information on an event having occurred in a system such that an operation state of the system at a point in time of the occurrence of the event is specified as a particular operation state of a plurality of different operation states, the plurality of different operation states corresponding to a plurality of pieces of sequence processing previously defined, the log further regarding information on the particular operation state; and extracting the log from the log file, based on information designatingthe particular operation state, in units of operation states of the system such that the log includes the information on the event having occurred in the particular operation state.

16. A non-transitory computer-readable medium storing a program for causing a computer in a system to perform:

recording a log into a log file, the log regarding information on an event having occurred in the system such that an operation state of the system at a point in time of the occurrence of the event is specified as a particular operation state of a plurality of different operation states, the plurality of different operation states corresponding to a plurality of pieces of sequence processing previously defined, the log further regarding information on the particular operation state; and extracting the log from the log file, based on information designating the particular operation state, in units of operation states of the system such that the log includes the information on the event having occurred in the particular operation state.

* * * * *